(12) United States Patent
Kay et al.

(10) Patent No.: US 7,625,284 B2
(45) Date of Patent: Dec. 1, 2009

(54) SYSTEMS AND METHODS FOR INDICATING INPUT ACTIONS IN A RHYTHM-ACTION GAME

(75) Inventors: Robert Kay, Cambridge, MA (US);
Greg LoPiccolo, Brookline, MA (US);
Daniel Schmidt, Somerville, MA (US);
Alexander Rigopulos, Belmont, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 0 days.

(21) Appl. No.: 12/139,880

(22) Filed: Jun. 16, 2008

(65) Prior Publication Data

US 2008/0311969 A1    Dec. 18, 2008

Related U.S. Application Data

(60) Provisional application No. 60/944,054, filed on Jun. 14, 2007.

(51) Int. Cl.
*G06F 17/00* (2006.01)
*G06F 19/00* (2006.01)

(52) U.S. Cl. .................. 463/31; 463/1; 463/7; 463/23; 463/30; 463/32; 463/33; 463/34; 463/35; 463/40; 463/41; 463/42; 84/609; 84/610; 84/611; 84/743

(58) Field of Classification Search .................. 463/1, 463/7, 23, 30–35, 40–42; 84/609–611, 743
See application file for complete search history.

(56) References Cited

U.S. PATENT DOCUMENTS

| 3,897,711 A * | 8/1975 | Elledge .................... 84/479 R |
| 5,140,889 A * | 8/1992 | Segan et al. .................... 84/723 |
| 5,739,457 A * | 4/1998 | Devecka .................... 84/743 |
| 6,075,197 A * | 6/2000 | Chan .................... 84/730 |
| 6,225,547 B1 * | 5/2001 | Toyama et al. .................... 84/611 |

(Continued)

FOREIGN PATENT DOCUMENTS

WO    WO 2007055522 A1 *    5/2007

OTHER PUBLICATIONS

Sheet Music—"Enter Sandman" by Metallica. [online] [dated Feb. 4, 2006] [retrieved Oct. 2, 2008] <URL: http://batterieandcosite.free.fr/Partitions/entersandman.pdf>. 4 Pages.*

(Continued)

*Primary Examiner*—Dmitry Suhol
*Assistant Examiner*—Milap Shah
(74) *Attorney, Agent, or Firm*—Proskauer Rose LLP

(57) ABSTRACT

Systems and methods for displaying cues indicating input actions in a rhythm-action game may include: displaying, to a player of a rhythm-action game, a lane divided into at least two sub-lanes, each sub-lane containing cues indicating a drum input element; and displaying, to the player, an additional cue spanning a plurality of the sub-lanes, the additional cue indicating a foot pedal action. In some embodiments, the additional cue may span all the sub-lanes. In some embodiments, each sub-lane may contain cues indicating a drum input element of a set of linearly arranged drum input elements. In other embodiments, each sub-lanes may correspond to a fret button of a simulated guitar and the additional cue may correspond to an open strum.

23 Claims, 11 Drawing Sheets

U.S. PATENT DOCUMENTS

| | | | |
|---|---|---|---|
| 6,268,557 B1 * | 7/2001 | Devecka | 84/743 |
| 6,342,665 B1 * | 1/2002 | Okita et al. | 84/609 |
| 6,347,998 B1 * | 2/2002 | Yoshitomi et al. | 463/42 |
| 6,369,313 B2 * | 4/2002 | Devecka | 84/743 |
| 6,379,244 B1 * | 4/2002 | Sagawa et al. | 463/7 |
| 6,390,923 B1 * | 5/2002 | Yoshitomi et al. | 463/43 |
| 6,410,835 B2 * | 6/2002 | Suzuki et al. | 84/464 R |
| 6,461,239 B1 * | 10/2002 | Sagawa et al. | 463/7 |
| 6,555,737 B2 * | 4/2003 | Miyaki et al. | 84/477 R |
| 6,645,067 B1 * | 11/2003 | Okita et al. | 463/7 |
| 6,663,491 B2 * | 12/2003 | Watabe et al. | 463/36 |
| 6,821,203 B2 | 11/2004 | Suga et al. | |
| 7,320,643 B1 * | 1/2008 | Brosius et al. | 463/37 |
| 7,459,324 B1 * | 12/2008 | Ptasinski et al. | 438/31 |
| 2002/0002900 A1 * | 1/2002 | Cho | 84/738 |
| 2006/0266200 A1 * | 11/2006 | Goodwin | 84/611 |
| 2007/0163427 A1 * | 7/2007 | Rigopulos et al. | 84/609 |
| 2007/0243915 A1 * | 10/2007 | Egozy et al. | 463/7 |
| 2007/0256540 A1 | 11/2007 | Salter | |

OTHER PUBLICATIONS

"Index of /Partitons" (entersandman.pdf source). [online] [dated Oct. 21, 2006] [retrieved Oct. 2, 2008] <URL: http://web.archive.org/web/20061021231758/http://batterieandcosite.free.fr/Partitions/>. pp. 1, 22, 36.*

* cited by examiner

SYSTEMS AND METHODS FOR INDICATING INPUT ACTIONS IN A RHYTHM-ACTION GAME

RELATED APPLICATIONS

The present application claims priority to U.S. Provisional Application Ser. No. 60/944,054, filed Jun. 14, 2007 and titled "Systems and Methods for Simulating a Rock Band Experience," the contents of which are expressly incorporated by reference herein.

FIELD OF THE INVENTION

The present invention relates to video games and, more specifically, indicating various user input actions for a rhythm action game.

BACKGROUND OF THE INVENTION

Music making is often a collaborative effort among many musicians who interact with each other. One form of musical interaction may be provided by a video game genre known as "rhythm-action," which involves a player performing phrases from a pre-recorded musical composition using a video game's input device to simulate a musical performance. If the player performs a sufficient percentage of the notes or cues displayed, he may score well and win the game. If the player fails to perform a sufficient percentage, he may score poorly and lose the game. Two or more players may compete against each other, such as by each one attempting to play back different, parallel musical phrases from the same song simultaneously, by playing alternating musical phrases from a song, or by playing similar phrases simultaneously. The player who plays the highest percentage of notes correctly may achieve the highest score and win. Two or more players may also play with each other cooperatively. In this mode, players may work together to play a song, such as by playing different parts of a song, either on similar or dissimilar instruments. One example of a rhythm-action game is the GUITAR HERO series of games published by Red Octane and Activision. Another example of a rhythm-action game is the KARAOKE REVOLUTION series of games published by Konami.

A rhythm action-game may require a number of inputs to be manipulated by a player simultaneously and in succession. Past rhythm action games have utilized lanes divided into sub-lanes to indicate actions. In these games, a lane is divided into a number of distinct sub-lanes, with each sub-lane corresponding to a different input element. For example, a lane for a player might be divided into five sub-lanes, with each sub-lane containing cues corresponding to a different one of five fret buttons on a simulated guitar. As cues appear in each of the sub-lanes, a player must press the appropriate corresponding fret button.

In some cases, the sub-lanes are laid out to correspond to a linear set of input elements. For example, a lane may be divided into five sub-lanes, each sub-lane containing red cues, green cues, yellow cues, blue cues and orange cues, respectively, to correspond to a guitar having a linear arrangement of a red button, green button, yellow button, blue button and orange button. Displaying cues may be more challenging in instances where input elements are not linearly arranged. For example, in the DRUMMANIA series of games published by Konami, players provided input via a number of drum pads and a foot pedal. Foot pedal actions were signified by a sub-lane containing cues shaped like feet.

SUMMARY OF THE INVENTION

Broadly speaking, the present invention relates to the realization that for rhythm action games, a display in which musical cues are confined to distinct sub-lanes may not be optimal for all types of input devices. For example, if a simulated drum set contains a number of drum pads and a foot pedal, the foot pedal may be neither "to the left" nor "to the right" of the drum pads. Thus there may not be a logical way to map the foot-pedal input cues to a linear series of sub lanes. For example, it may be natural to display cues for four linearly arranged drum pads contained in four corresponding sub-lanes. However, if a foot-pedal cue is displayed in a sub lane to the right of the sub-lane corresponding to the furthest-right drum pad, it may have the undesirable effect of confusing a player into attempting to strike a drum pad that does not exist. While, as mentioned above in the context of DRUMMANIA, cues for foot-pedal actions can be specially colored or shaped to somewhat mitigate this confusion potential, a player is still faced with a linear display of a number of sub-lanes that does not logically map to the input devices the player is given.

The present invention addresses this problem by introducing cues that span a plurality or all of the sub-lanes contained within a lane. These larger cues are more difficult to mistake for cues indicating one of a number of linear input elements, and may thus be less likely to cause players to mistakenly attempt to use an incorrect or non-existent input.

In one embodiment, the present invention relates to methods for displaying a foot-pedal cue in a rhythm-action game. In one embodiment, a method includes: displaying, to a player of a rhythm-action game, a lane divided into at least two sub-lanes, each sub-lane containing cues indicating a drum input element; and displaying, to the player, an additional cue spanning a plurality of the sub-lanes, the additional cue indicating a foot pedal action. In some embodiments, the additional cue may span all the sub-lanes. In some embodiments, the additional cue may be a different color than other cues. In some embodiments, each sub-lane may contain cues indicating a drum input element of a set of linearly arranged drum input elements.

In another embodiment, the present invention relates to computer readable media comprising executable code for displaying a foot-pedal cue in a rhythm-action game wherein cues indicating a number of drum input elements are distributed across a number of sub-lanes. In one embodiment, the computer readable media has: executable code for displaying, to a player of a rhythm-action game, a lane divided into at least two sub-lanes, each sub-lane containing cues indicating a drum input element; and executable code for displaying, to the player, at least one additional cue spanning a plurality of the sub-lanes, the additional cue indicating a foot pedal action.

In still another embodiment, present invention relates to a method for displaying cues in a rhythm-action game to indicate a specific input element. In one embodiment, the method includes: displaying, to a player of a rhythm-action game, a lane divided into X sub-lanes, each sub-lane containing cues indicating a unique one of a set of X input actions; and displaying, to the player, an additional cue spanning a plurality of the sub-lanes, the additional cue indicating a first input action not in the set of X input actions. In some embodiments, each of the set of X input actions corresponds to an input element in a linear arrangement, and the first input action corresponds to an input element not in the linear arrangement. In some embodiments, each of the set of X input actions identifies a fret button to be depressed in combination with a strum, and the first input action corresponds to an open strum.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION

Figure 1A:
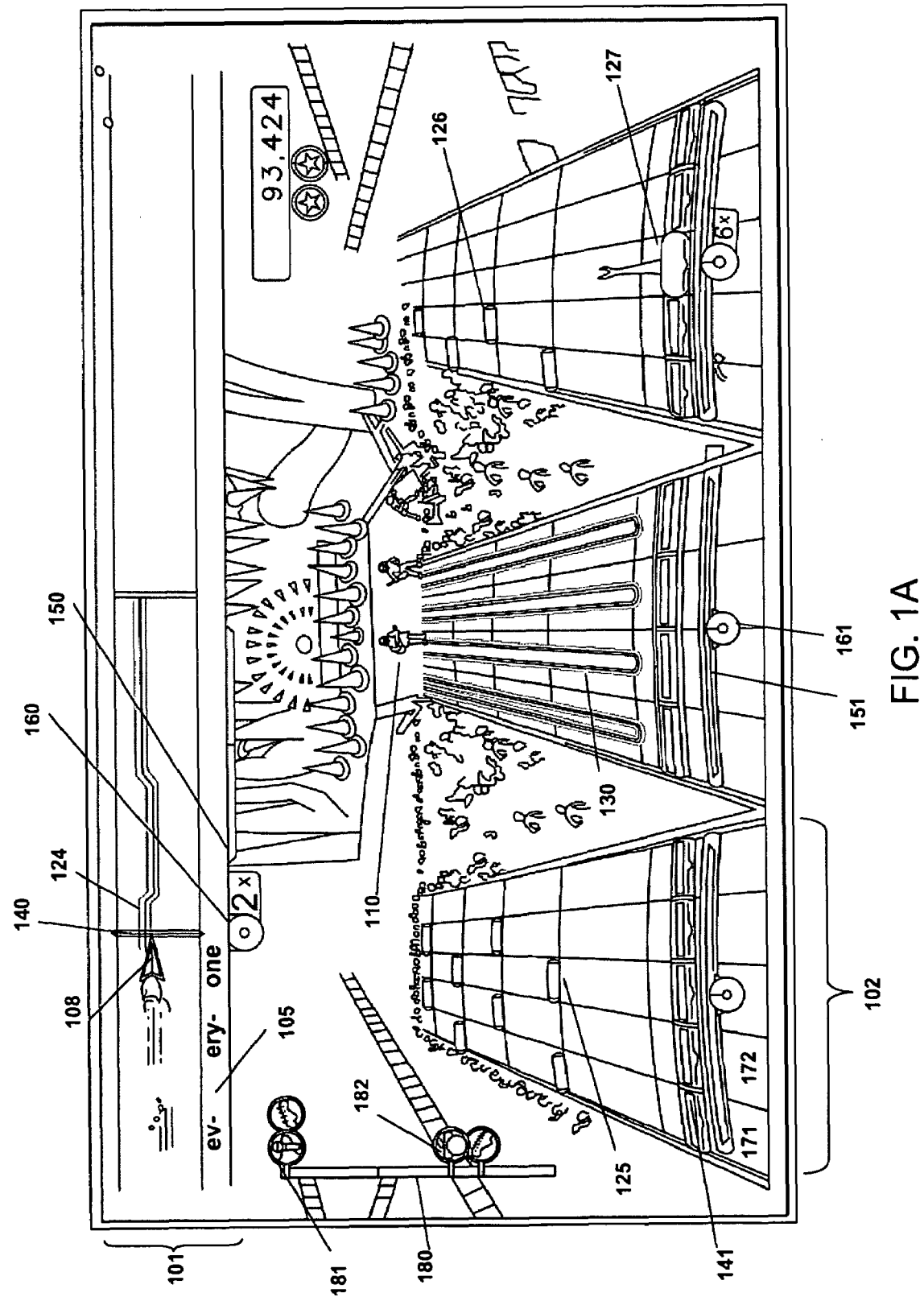
FIG. 1A is an example screenshot of one embodiment of a multiplayer rhythm-action game.

Referring now to FIG. 1A, an embodiment of a screen display for a video game in which four players emulate a musical performance is shown. One or more of the players may be represented on screen by an avatar 110. Although FIG. 1A depicts an embodiment in which four players participate, any number of players may participate simultaneously. For example, a fifth player may join the game as a keyboard player. In this case, the screen may be further subdivided to make room to display a fifth avatar and/or music interface. In some embodiments, an avatar 110 may be a computer-generated image. In other embodiments, an avatar may be a digital image, such as a video capture of a person. An avatar may be modeled on a famous figure or, in some embodiments, the avatar may be modeled on the game player associated with the avatar.

Still referring to FIG. 1A, a lane 101 102 has one or more game "cues" 124, 125, 126, 127, 130 corresponding to musical events distributed along the lane. During gameplay, the cues, also referred to as "musical targets," "gems," or "game elements," appear to flow toward a target marker 140, 141. In some embodiments, the cues may appear to be flowing towards a player. The cues are distributed on the lane in a manner having some relationship to musical content associated with the game level. For example, the cues may represent note information (gems spaced more closely together for shorter notes and further apart for longer notes), pitch (gems placed on the left side of the lane for notes having lower pitch and the right side of the lane for higher pitch), volume (gems may glow more brightly for louder tones), duration (gems may be "stretched" to represent that a note or tone is sustained, such as the gem 127), articulation, timbre or any other time-varying aspects of the musical content. The cues may be any geometric shape and may have other visual characteristics, such as transparency, color, or variable brightness.

As the gems move along a respective lane, musical data represented by the gems may be substantially simultaneously played as audible music. In some embodiments, audible music represented by a gem is only played (or only played at full or original fidelity) if a player successfully "performs the musical content" by capturing or properly executing the gem. In some embodiments, a musical tone is played to indicate successful execution of a musical event by a player. In other embodiments, a stream of audio is played to indicate successful execution of a musical event by a player. In certain embodiments, successfully performing the musical content triggers or controls the animations of avatars.

In other embodiments, the audible music, tone, or stream of audio represented by a cue is modified, distorted, or otherwise manipulated in response to the player's proficiency in executing cues associated with a lane. For example, various digital filters can operate on the audible music, tone, or stream of audio prior to being played by the game player. Various parameters of the filters can be dynamically and automatically modified in response to the player capturing cues associated with a lane, allowing the audible music to be degraded if the player performs poorly or enhancing the audible music, tone, or stream of audio if the player performs well. For example, if a player fails to execute a game event, the audible music, tone, or stream of audio represented by the failed event may be muted, played at less than full volume, or filtered to alter its sound.

In certain embodiments, a "wrong note" sound may be substituted for the music represented by the failed event. Conversely, if a player successfully executes a game event, the audible music, tone, or stream of audio may be played normally. In some embodiments, if the player successfully executes several, successive game events, the audible music, tone, or stream of audio associated with those events may be enhanced, for example, by adding an echo or "reverb" to the audible music. The filters can be implemented as analog or digital filters in hardware, software, or any combination thereof. Further, application of the filter to the audible music output, which in many embodiments corresponds to musical events represented by cues, can be done dynamically, that is, during play. Alternatively, the musical content may be processed before game play begins. In these embodiments, one or more files representing modified audible output may be created and musical events to output may be selected from an appropriate file responsive to the player's performance.

In addition to modification of the audio aspects of game events based on the player's performance, the visual appearance of those events may also be modified based on the player's proficiency with the game. For example, failure to execute a game event properly may cause game interface elements to appear more dimly. Alternatively, successfully executing game events may cause game interface elements to glow more brightly. Similarly, the player's failure to execute game events may cause their associated avatar to appear embarrassed or dejected, while successful performance of game events may cause their associated avatar to appear happy and confident. In other embodiments, successfully executing cues associated with a lane causes the avatar associated with that lane to appear to play an instrument. For example, the drummer avatar will appear to strike the correct drum for producing the audible music. Successful execution of a number of successive cues may cause the corresponding avatar to execute a "flourish," such as kicking their leg, pumping their fist, performing a guitar "windmill," spinning around, winking at the "crowd," or throwing drum sticks.

Player interaction with a cue may be required in a number of different ways. In general, the player is required to provide input when a cue passes under or over a respective one of a set of target markers 140, 141 disposed on the lane. For example, the player associated with lane 102 (lead guitar) may use a specialized controller to interact with the game that simulates a guitar, such as a Guitar Hero SG Controller, manufactured by RedOctane of Sunnyvale, Calif. In this embodiment, the player executes the cue by activating the "strum bar" while pressing the correct fret button of the controller when the cue 125 passes under the target marker 141. In other embodiments, the player may execute a cue by performing a "hammer on" or "pull off," which requires quick depression or release of a fret button without activation of the strum bar. In other embodiments, the player may be required to perform a cue using a "whammy bar" provided by the guitar controller. For example, the player may be required to bend the pitch of a note represented by a cue using the whammy bar. In some embodiments, the guitar controller may also use one or more "effects pedals," such as reverb or fuzz, to alter the sound reproduced by the gaming platform.

In other embodiments, player interaction with a cue may comprise singing a pitch and or a lyric associated with a cue. For example, the player associated with lane 101 may be required to sing into a microphone to match the pitches indicated by the gem 124 as the gem 124 passes over the target marker 140. As shown in FIG. 1A, the notes of a vocal track are represented by "note tubes" 124. In the embodiment shown in FIG. 1A, the note tubes 124 appear at the top of the screen and flow horizontally, from right to left, as the musical content progresses. In this embodiment, vertical position of a note tube 124 represents the pitch to be sung by the player; the length of the note tube indicates the duration for which the player must hold that pitch. In other embodiments, the note tubes may appear at the bottom or middle of the screen. The arrow 108 provides the player with visual feedback regarding the pitch of the note that is currently being sung. If the arrow is above the note tube 124, the player needs to lower the pitch of the note being sung. Similarly, if the arrow 108 is below the note tube 124, the player needs to raise the pitch of the note being sung. In these embodiments, the vocalist may provide vocal input using a USB microphone of the sort manufactured by Logitech International of Switzerland. In other embodiments, the vocalist may provide vocal input using another sort of simulated microphone. In still further embodiments, the vocalist may provide vocal input using a traditional microphone commonly used with amplifiers. As used herein, a "simulated microphone" is any microphone apparatus that does not have a traditional XLR connector. As shown in FIG. 1A, lyrics 105 may be provided to the player to assist their performance.

In still other embodiments, a player interaction with a cue may comprise any manipulation of any simulated instrument and/or game controller. Although a microphone may not traditionally be thought of as a musical instrument, for purposes of this application a the terms "musical instrument" "simulated instrument" and "simulated musical instrument" encompass microphones.

As shown in FIG. 1A, each lane may be subdivided into a plurality of segments. Each segment may correspond to some unit of musical time, such as a beat, a plurality of beats, a measure, or a plurality of measures. Although the embodiment shown in FIG. 1A show equally-sized segments, each segment may have a different length depending on the particular musical data to be displayed. In addition to musical data, each segment may be textured or colored to enhance the interactivity of the display. For embodiments in which a lane comprises a tunnel or other shape (as described above), a cursor is provided to indicate which surface is "active," that is, with which lane surface a player is currently interacting. In these embodiments, the viewer can use an input device to move the cursor from one surface to another. As shown in FIG. 1A, each lane may also be divided into a number of sub-lanes, with each sub-lane containing musical targets indicating different input elements. For example, the lane 102 is divided into five sub-lanes, including sub-lanes 171 and 172. Each sub-lane may correspond to a different fret button on the neck of a simulated guitar.

Figure 1B:
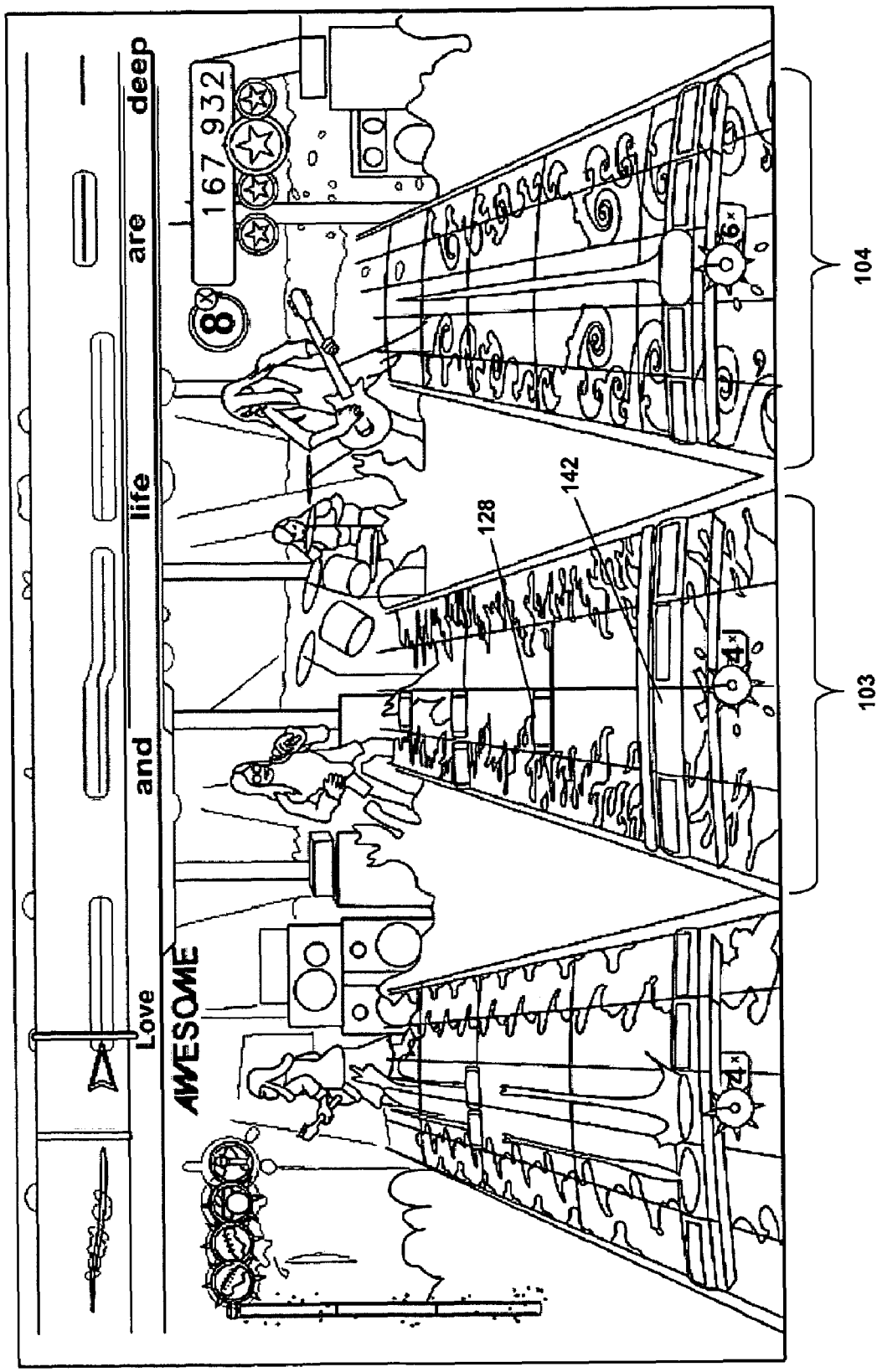
FIG. 1B is a second example screenshot of one embodiment of a multiplayer rhythm-action game.

Referring now to FIG. 1B, a second embodiment of a screen display for a video game in which four players emulate a musical performance is shown. In the embodiment shown, the lanes 103 104 have graphical designs corresponding to gameplay events. For example, lane 103 comprises a flame pattern, which may correspond to a bonus activation by the player. For example, lane 104 comprises a curlicue pattern, which may correspond to the player achieving the 6x multiplier shown.

In other embodiments, a game display may alternate the display of one or more avatars and/or the display of the band as a whole. For example, during the performance of a song, a display may switch between a number of camera angle providing, for example, close-ups of the guitarist, bassist, drummer, or vocalist, shots of the band as a whole, shots of the crowd, and/or any combination of the avatars, stage, crowd, and instruments. In some embodiments, the sequence and timing of camera angles may be selected to resemble a music video. In some embodiments, the camera angles may be selected to display an avatar of a player who is performing a distinctive portion of a song. In other embodiments the camera angles may be selected to display an avatar of a player who is performing particularly well or poorly. In some embodiments, an avatar's gestures or actions may correspond to the current camera angle. For example, an avatar may have certain moves, such as a jump, head bang, devil horns, special dance, or other move, which are performed when a close-up of the avatar is shown. In some embodiments, the avatars motions may be choreographed to mimic the actual playing of the song. For example, if a song contains a section where the drummer hits a cymbal crash, the drummer avatar may be shown to hit a cymbal crash at the correct point in the song.

In some embodiments, avatars may interact with the crowd at a avenue, and camera angles may correspond to the interaction. For example, in one camera angle, an avatar may be shown pointing at various sections of the crowd. In the next camera angle the various sections of the crowd may be shown screaming, waving, or otherwise interacting with the avatar. In other embodiments, avatars may interact with each other. For example, two avatars may lean back-to-back while performing a portion of a song. Or for example, the entire band may jump up and land simultaneously, and stage pyrotechnics may also be synchronized to the band's move.

In some embodiments, the "lanes" containing the musical cues to be performed by the players may be on screen continuously. In other embodiments one or more lanes may be removed in response to game conditions, for example if a player has failed a portion of a song, or if a song contains an extended time without requiring input from a given player.

Although depicted in FIGS. 1A and 1B, in some embodiments (not shown), instead of a lane extending from a player's avatar, a three-dimensional "tunnel" comprising a number of lanes extends from a player's avatar. The tunnel may have any number of lanes and, therefore, may be triangular, square, pentagonal, sextagonal, septagonal, octagonal, nonanogal, or any other closed shape. In still other embodiments, the lanes do not form a closed shape. The sides may form a road, trough, or some other complex shape that does not have its ends connected. For ease of reference throughout this document, the display element comprising the musical cues for a player is referred to as a "lane."

In some embodiments, a lane does not extend perpendicularly from the image plane of the display, but instead extends obliquely from the image plane of the display. In further embodiments, the lane may be curved or may be some combination of curved portions and straight portions. In still further embodiments, the lane may form a closed loop through which the viewer may travel, such as a circular or ellipsoid loop.

It should be understood that the display of three-dimensional "virtual" space is an illusion achieved by mathematically "rendering" two-dimensional images from objects in a three-dimensional "virtual space" using a "virtual camera," just as a physical camera optically renders a two-dimensional view of real three-dimensional objects. Animation may be achieved by displaying a series of two-dimensional views in rapid succession, similar to motion picture films that display multiple still photographs per second.

To generate the three-dimensional space, each object in the three-dimensional space is typically modeled as one or more polygons, each of which has associated visual features such as texture, transparency, lighting, shading, anti-aliasing, z-buffering, and many other graphical attributes. The combination of all the polygons with their associated visual features can be used to model a three-dimensional scene. A virtual camera may be positioned and oriented anywhere within the scene. In many cases, the camera is under the control of the viewer, allowing the viewer to scan objects. Movement of the camera through the three-dimensional space results in the creation of animations that give the appearance of navigation by the user through the three-dimensional environment.

A software graphics engine may be provided which supports three-dimensional scene creation and manipulation. A graphics engine generally includes one or more software modules that perform the mathematical operations necessary to "render" the three-dimensional environment, which means that the graphics engine applies texture, transparency, and other attributes to the polygons that make up a scene. Graphic engines that may be used in connection with the present invention include Gamebryo, manufactured by Emergent Game Technologies of Calabasas, Calif., the Unreal Engine, manufactured by Epic Games, and Renderware, manufactured by Criterion Software of Austin, Tex. In other embodiments, a proprietary graphic engine may be used. In many embodiments, a graphics hardware accelerator may be utilized to improve performance. Generally, a graphics accelerator includes video memory that is used to store image and environment data while it is being manipulated by the accelerator.

In other embodiments, a three-dimensional engine may not be used. Instead, a two-dimensional interface may be used. In such an embodiment, video footage of a band can be used in the background of the video game. In others of these embodiments, traditional two-dimensional computer-generated representations of a band may be used in the game. In still further embodiments, the background may be only slightly related, or unrelated, to the band. For example, the background may be a still photograph or an abstract pattern of colors. In these embodiments, the lane may be represented as a linear element of the display, such as a horizontal, vertical or diagonal element.

Still referring to FIG. 1B The player associated with the middle lane 103 (drummer) may also use a specialized controller to interact with the game that simulates a drum kit, such as the DrumMania drum controller, manufactured by Topway Electrical Appliance Co., Ltd. of Shenzhen, China. In some embodiments, the drum controller provides four drum pads and a kick drum pedal. In other embodiments, the drum controller surrounds the player, as a "real" drum kit would do. In still other embodiments, the drum controller is designed to look and feel like an analog drum kit. In these embodiments, a cue may be associated with a particular drum. The player strikes the indicated drum when the cue 128 passes under the target marker 142, to successfully execute cue 128. In other embodiments, a player may use a standard game controller to play, such as a DualShock game controller, manufactured by Sony Corporation.

Referring back to FIG. 1A, in some embodiments, improvisational or "fill" sections may be indicated to a drummer or any other instrumentalist. In FIG. 1A, a drum fill is indicated by long tubes 130 filling each of the sub-lanes of the center lane which corresponds to the drummer.

In some embodiments, a player is associated with a "turntable" or "scratch" track. In these embodiments, the player may provide input using a simulated turntable such as the turntable controller sold by Konami Corporation.

Local play may be competitive or it may be cooperative. Cooperative play is when two or more players work together in an attempt to earn a combined score. Competitive play may be when a player competes against another player in an attempt to earn a higher score. In other embodiments, competitive play involves a team of cooperating players competing against another team of competing players in attempt to achieve a higher team score than the other team. Competitive local play may be head-to-head competition using the same instrument, head-to-head competition using separate instruments, simultaneous competition using the same instrument, or simultaneous competition using separate instruments. In some embodiments, rather than competing for a high score, players or teams may compete for the best crowd rating, longest consecutive correct note streak, highest accuracy, or any other performance metric. In some embodiments, competitive play may feature a "tug-of-war" on a crowd meter, in which each side tries to "pull" a crowd meter in their direction by successfully playing a song. In one embodiment, a limit may be placed on how far ahead one side can get in a competitive event. In this manner, even a side which has been significantly outplayed in the first section of a song may have a chance late in a song to win the crowd back and win the event.

In one embodiment, competition in local play may involve two or more players using the same type of instrument controller to play the game, for example, guitar controllers. In some embodiments, each player associates themselves with a band in order to begin play. In other embodiments, each player can simply play "solo," without association with a band. In these embodiments, the other instruments required for performance of a musical composition are reproduced by the gaming platform. Each of the players has an associated lane and each player is alternately required to perform a predetermined portion of the musical composition. Each player scores depending on how faithfully he or she reproduces their portions of the musical composition. In some embodiments, scores may be normalized to produce similar scores and promote competition across different difficulty levels. For example, a guitarist on a "medium" difficulty level may be required to perform half of the notes as a guitarist on a "hard" difficulty level and, as such, should get 100 points per note instead of 50. An additional per-difficulty scalar may be required to make this feel "fair."

This embodiment of head-to-head play may be extended to allow the players to use different types of game controllers and, therefore, to perform different portions of the musical composition. For example, one player may elect to play using a guitar-type controller while a second player may play using a drum-type controller. Alternatively, each player may use a guitar-type controller, but one player elects to play "lead guitar" while the other player elects to play "rhythm guitar" or, in some embodiments, "bass guitar." In these examples, the gaming platform reproduces the instruments other than the guitar when it is the first player's turn to play, and the lane associated with the first player is populated with gems representing the guitar portion of the composition. When it is time for the second player to compete, the gaming platform reproduces the instruments other than, for example, the drum part, and the second player's lane is populated with gems representing the drum portion of the musical composition. In some of these embodiments, a scalar factor may be applied to the score of one of the player's to compensate for the differences in the parts of the musical composition.

In still other embodiments, the players may compete simultaneously, that is, each player may provide a musical performance at the same time as the other player. In some embodiments, both players may use the same type of controller. In these embodiments, each player's lane provides the same pattern of cues and each player attempts to reproduce the musical performance identified by those elements more faithfully than the other player. In other embodiments, the players use different types of controllers. In these embodiments, one player attempts to reproduce one portion of a musical composition while the other player tries to represent a different portion of the same composition.

In any of these forms of competition, the relative performance of a player may affect their associated avatar. For example, the avatar of a player that is doing better than the competition may, for example, smile, look confident, glow, swagger, "pogo stick," etc. Conversely, the losing player's avatar may look depressed, embarrassed, etc.

Instead of competing, the players may cooperate in an attempt to achieve a combined score. In these embodiments, the score of each player contributes to the score of the team, that is, a single score is assigned to the team based on the performance of all players. As described above, a scalar factor may be applied to the score of one of the player's to compensate for the differences in the parts of the musical composition.

Still referring to FIG. 1A, an indicator of the performance of a number of players on a single performance meter 180 is shown. In brief overview, each of the players in a band may be represented by an icon 181 182. In the figure shown the icons 181 182 are circles with graphics indicating the instrument the icon corresponds to. For example, the icon 181 contains a microphone representing the vocalist, while icon 182 contains a drum set representing the drummer. The position of a player's icon on the meter 180 indicates a current level of performance for the player. A colored bar on the meter may indicate the performance of the band as a whole.

A single meter 180 may be used to display the performance level of multiple players as well as a band as a whole. Although the meter shown displays the performance of 4 players and a band as a whole, in other embodiments, any number of players or bands may be displayed on a meter, including two, three, four, five, six, seven, eight, nine, or ten players, and any number of bands.

The meter 180 may indicate any measure of performance, and performance may be computed in any manner. In some embodiments, the meter 180 may indicate a weighted rolling average of a player's performance. For example, a player's position on the meter may reflect a percentage of notes successfully hit, where more recent notes are weighted more heavily than less recent notes. In another embodiment, a player's position on the meter may be calculated by computing a weighted average of the player's performance on a number of phrases. In some embodiments, a player's position on the meter may be updated on a note-by-note basis. In other embodiments, a player's position on the meter may be updated on a phrase-by-phrase basis. The meter may also indicate any measure of a band's performance. In some embodiments, the meter may display the band's performance as an average of each of the players' performances. In other embodiments, the indicated band's performance may comprise a weighted average in which some players' performances are more heavily weighted.

In some embodiments, the meter 180 may comprise subdivisions which indicate relative levels of performance. For example, in the embodiment shown, the meter 140 is divided roughly into thirds, which may correspond to Good, Average, and Poor performance.

In some embodiments, a player or players in a band may "fail" a song if their performance falls to the bottom of the meter. In some embodiments, consequences of failing a song may include being removed from the rest of the song. In these embodiments, a player who has failed may have their lane removed from the display, and the audio corresponding to that player's part may be removed. In some embodiments, if a single member of a band fails a song, the band may consequently fail the song. In other embodiments, if a member of a band fails a song, one or more other members of the band may continue playing. In still other embodiments, one or more other members of a band may reinstate the failed player.

The icons 181, 182 displayed to indicate each player may comprise any graphical or textual element. In some embodiments, the icons may comprise text with the name of one or more of the players. In another embodiment the icon may comprise text with the name of the instrument of the player. In other embodiments, the icons may comprise a graphical icon corresponding to the instrument of the player. For example, an icon containing a drawing of a drum 182 may be used to indicate the performance of a drummer.

The overall performance of the band may be indicated in any manner on the meter 180. In the embodiment shown, a filled bar indicates the band's performance as a whole. In other embodiments, the band's performance may be represented by an icon. In some embodiments, individual performances may not be indicated on a meter, and only the performance of the band as a whole may be displayed.

Although described above in the context of a single player providing a single type of input, a single player may provide one or more types of input simultaneously. For example, a single player providing instrument-based input (such as for a lead guitar track, bass guitar track, rhythm guitar track, keyboard track, drum track, or other percussion track) and vocal input simultaneously.

Still referring to FIG. 1A, meters 150 151 may be displayed for each player indicating an amount of stored bonus. The meters may be displayed graphically in any manner, including a bar, pie, graph, or number. In some embodiments, each player may be able to view the meters of remote players. In other embodiments, only bonus meters of local players may be shown. Bonuses may be accumulated in any manner including, without limitation, by playing specially designated musical phrases, hitting a certain number of consecutive notes, or by maintaining a given percentage of correct notes.

In some embodiments, if a given amount of bonuses are accumulated, a player may activate the bonus to trigger an in-game effect. An in-game effect may comprise a graphical display change including, without limitation, an increase or change in crowd animation, avatar animation, performance of a special trick by the avatar, lighting change, setting change, or change to the display of the lane of the player. An in-game effect may also comprise an aural effect, such as a guitar modulation, including feedback, distortion, screech, flange, wah-wah, echo, or reverb, a crowd cheer, an increase in volume, and/or an explosion or other aural signifier that the bonus has been activated. An in-game effect may also comprise a score effect, such as a score multiplier or bonus score addition. In some embodiments, the in-game effect may last a predetermined amount of time for a given bonus activation.

In some embodiments, bonuses may be accumulated and/or deployed in a continuous manner. In other embodiments, bonuses may be accumulated and/or deployed in a discrete manner. For example, instead of the continuous bar shown in FIG. 1A, a bonus meter may comprise a number of "lights" each of which corresponds to a single bonus earned. A player may then deploy the bonuses one at a time.

In some embodiments, bonus accumulation and deployment may be different for each simulated instrument. For example, in one embodiment only the bass player may accumulate bonuses, while only the lead guitarist can deploy the bonuses.

FIG. 1A also depicts score multiplier indicators 160, 161. A score multiplier indicator 160, 161 may comprise any graphical indication of a score multiplier currently in effect for a player. In some embodiments, a score multiplier may be raised by hitting a number of consecutive notes. In other embodiments, a score multiplier may be calculated by averaging score multipliers achieved by individual members of a band. For example, a score multiplier indicator 160 161 may comprise a disk that is filled with progressively more pie slices as a player hits a number of notes in a row. Once the player has filled the disk, the player's multiplier may be increased, and the disk may be cleared. In some embodiments, a player's multiplier may be capped at certain amounts. For example, a drummer may be limited to a score multiplier of no higher than 4×. Or for example, a bass player may be limited to a score multiplier of no higher than 6×.

In some embodiments, a separate performance meter (not shown) may be displayed under the lane of each player. This separate performance meter may comprise a simplified indication of how well the player is doing. In one embodiment, the separate performance meter may comprise an icon which indicates whether a player is doing great, well, or poorly. For example, the icon for "great" may comprise a hand showing devil horns, "good" may be a thumbs up, and "poor" may be a thumbs down. In other embodiments, a player's lane may flash or change color to indicate good or poor performance.

Each player may use a gaming platform in order to participate in the game. In one embodiment, the gaming platform is a dedicated game console, such as: PLAYSTATION2, PLAYSTATION3, or PLAYSTATION PERSONAL, manufactured by Sony Corporation; DREAMCAST, manufactured by Sega Corp.; GAMECUBE, GAMEBOY, GAMEBOY ADVANCE, or WII, manufactured by Nintendo Corp.; or XBOX or XBOX360, manufactured by Microsoft Corp. In other embodiments, the gaming platform comprises a personal computer, personal digital assistant, or cellular telephone. In some embodiments, the players associated with avatars may be physically proximate to one another. For example, each of the players associated with the avatars may connect their respective game controllers into the same gaming platform ("local play").

Figure 1C:
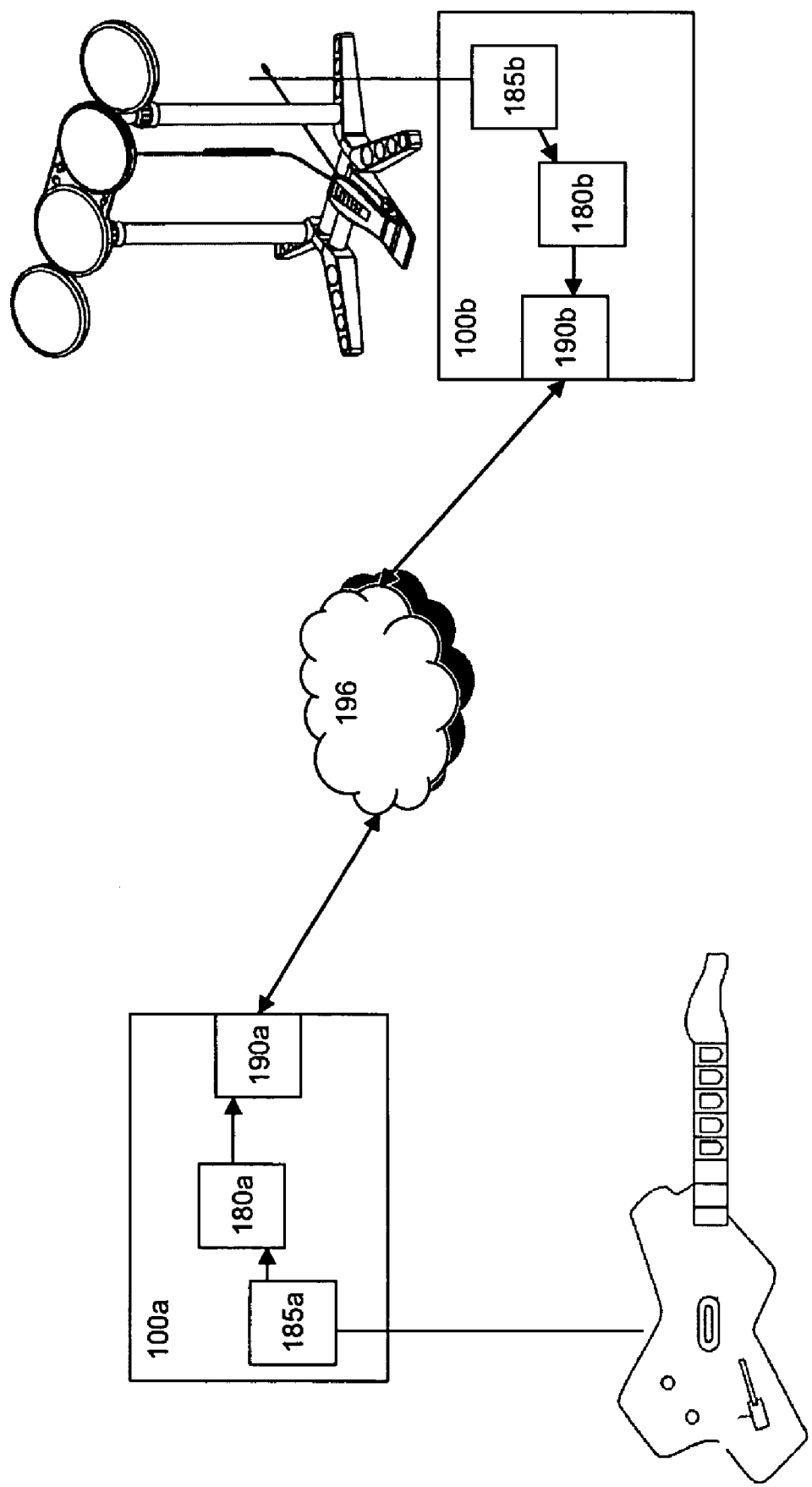
FIG. 1C is a block diagram of a system facilitating network play of a rhythm action game.

In some embodiments, one or more of the players may participate remotely. FIG. 1C depicts a block diagram of a system facilitating network play of a rhythm action game. As shown in FIG. 1C, a first gaming platform 100a and a second gaming platform 100b communicate over a network 196, such as a local area network (LAN), a metropolitan area network (MAN), or a wide area network (WAN) such as the Internet or the World Wide Web. The gaming platforms connect to the network through one of a variety of connections including standard telephone lines, LAN or WAN links (e.g., T1, T3, 56 kb, X.25), broadband connections (e.g., ISDN, Frame Relay, ATM), and wireless connections (e.g., 802.11a, 802.11g, Wi-Max). The first gaming platform 100a and the second gaming platform 100b may be any of the types of gaming platforms identified above. In some embodiments, the first gaming platforms 100a and the second gaming platform 100b are of different types.

When a networked multiplayer game session begins at the direction of one of the players, that player's gaming platform 100a (the "host") transmits a "start" instruction to all other gaming platforms participating in the networked game, and the game begins on all platforms. A timer begins counting on each gaming platform, each player's game cues are displayed, and each player begins attempting to perform the musical composition.

Gameplay on gaming platform 100a is independent from game play on gaming platform 100b, except that each player's gaming platform contains a local copy of the musical event data for all other players. The timers on the various gaming platforms communicate with each other via the network 196 to maintain approximate synchrony using any number of the conventional means known in the art.

The gaming platforms 100a, 100b also continually transmit game score data to each other, so that each system (and player) remains aware of the game score of all other systems (and players). Similarly, this is accomplished by any number of means known in the art. Note that this data is not particularly timing sensitive, because if there is momentary disagreement between any two gaming platforms regarding the score (or similar game-related parameters), the consequences to gameplay are negligible.

In one embodiment, as each player plays the game at their respective location, an analyzer module 180a, 180b on that player's gaming platform 100a, 100b continually extracts data from an event monitor 185a, 185b regarding the local player's performance, referred to hereafter as "emulation data". Emulation data may include any number of parameters that describe how well the player is performing. Some examples of these parameters include:

whether or not the most recent event type was a correctly-played note or an incorrectly-played noted;

a timing value representing the difference between actual performance of the musical event and expected performance of the musical event;

a moving average of the distribution of event types (e.g., the recent ratio of correct to incorrect notes);

a moving average of the differences between the actual performance of musical events and the expected performance times of the musical events; or a moving average of timing errors of incorrect notes.

Each analyzer module 180a, 180b continually transmits the emulation data it extracts over the network 196 using transceiver 190a, 190b; each event monitor 185a, 185b continually receives the other gaming platform's emulation data transmitted over the network 196.

In one embodiment, the emulation data essentially contains a statistical description of a player's performance in the recent past. The event monitor 185a, 185b uses received emulation data to create a statistical approximation of the remote player's performance.

In one particular example, an incoming emulation parameter from a remote player indicates that the most recent remote event was correctly reproduced. When the local event monitor 185a, 185b reaches the next note in the local copy of the remote player's note data, it will respond accordingly by "faking" a successfully played note, triggering the appropriate sound. That is, the local event monitor 185a, 185b will perform the next musical event from the other players' musical event data, even though that event was not necessarily actually performed by the other player's event monitor 185a, 185b. If instead the emulation parameter had indicated that the most recent remote event was a miss, no sound would be triggered.

In another particular example, an incoming emulation parameter from a remote player indicates that, during the last 8 beats, 75% of events were correctly reproduced and 25% were not correctly reproduced. When the local event monitor 185a reaches the next note in the local copy of the remote player's note data, it will respond accordingly by randomly reproducing the event correctly 75% of the time and not reproducing it correctly 25% of the time.

In another particular example, an incoming emulation parameter from a remote player indicates that, during the last 4 beats, 2 events were incorrectly performed, with an average timing error of 50 "ticks." The local event monitor 185a, 185b will respond accordingly by randomly generating incorrect events at a rate of 0.5 misses-per-beat, displacing them in time from nearby notes by the specified average timing error.

The above three cases are merely examples of the many types of emulation parameters that may be used. In essence, the remote player performances are only emulated (rather than exactly reproduced) on each local machine.

In this embodiment, the analyzer module 180a, 180b may extract musical parameters from the input and transmit them over a network 196 to a remote gaming platform. For example, the analyzer module 180a, 180b may simply transmit the input stream over a network 196 or it may extract the information into a more abstract form, such as "faster" or "lower." Although described in the context of a two-player game, the technique may be used with any number of players.

Still referring to FIG. 1C, in another embodiment, analyzer module 180a, 180b extracts data from the event monitor 185a, 185b regarding the local player's performance. In this embodiment, however, the extracted data is transmitted over the network 550 using the transceiver 190a, 190b. When the analyzer 180a, 180b receives the transmitted data, it generates an emulation parameter representing the other player's musical performance and provides the locally-generated emulation parameter to the event monitor 185a, 185b, as described above. One advantage of this embodiment is that each player may locally set their preference for how they want the event monitor 185a, 185b to act on emulation parameters.

In other embodiments, the transmitted data is associated with a flag that indicates whether the transmitted data represents a successfully executed musical event or an unsuccessfully executed musical event. In these embodiments, the analyzer 180a, 180b provides a locally-generated emulation parameter to the event monitor 185a, 185b based on the flag associated with the transmitted data.

One unusual side effect of these techniques is that each local player does not hear an exact reproduction of the remote players' performances; only a statistical approximation. However, these statistical approximations have two countervailing positive attributes: because they are synchronized to the local player's timer and the local copy of the remote players' note data, they are synchronous with the local player's performance; and while not exact reproductions, they are "close enough" to effectively communicate to the local player the essence of how well the remote players are performing musically. In this model, delays in the transmission of the data over the network 196 do not have the intolerable side effect of causing cacophonous asynchronicity between the note streams triggering sounds on each player's local system.

In other embodiments, a central server may be used to facilitate communication between the gaming platforms 100a, 100b. Extraction of emulation parameters is performed, as described above. The server distributes data, whether music performance data or emulation parameter data, to all other gaming platforms participating in the current game. In other embodiments, the server may store received data for use later. For example, a band may elect to use the stored data for the performance of a band member who is unavailable to play in a specific game.

Figure 1D:
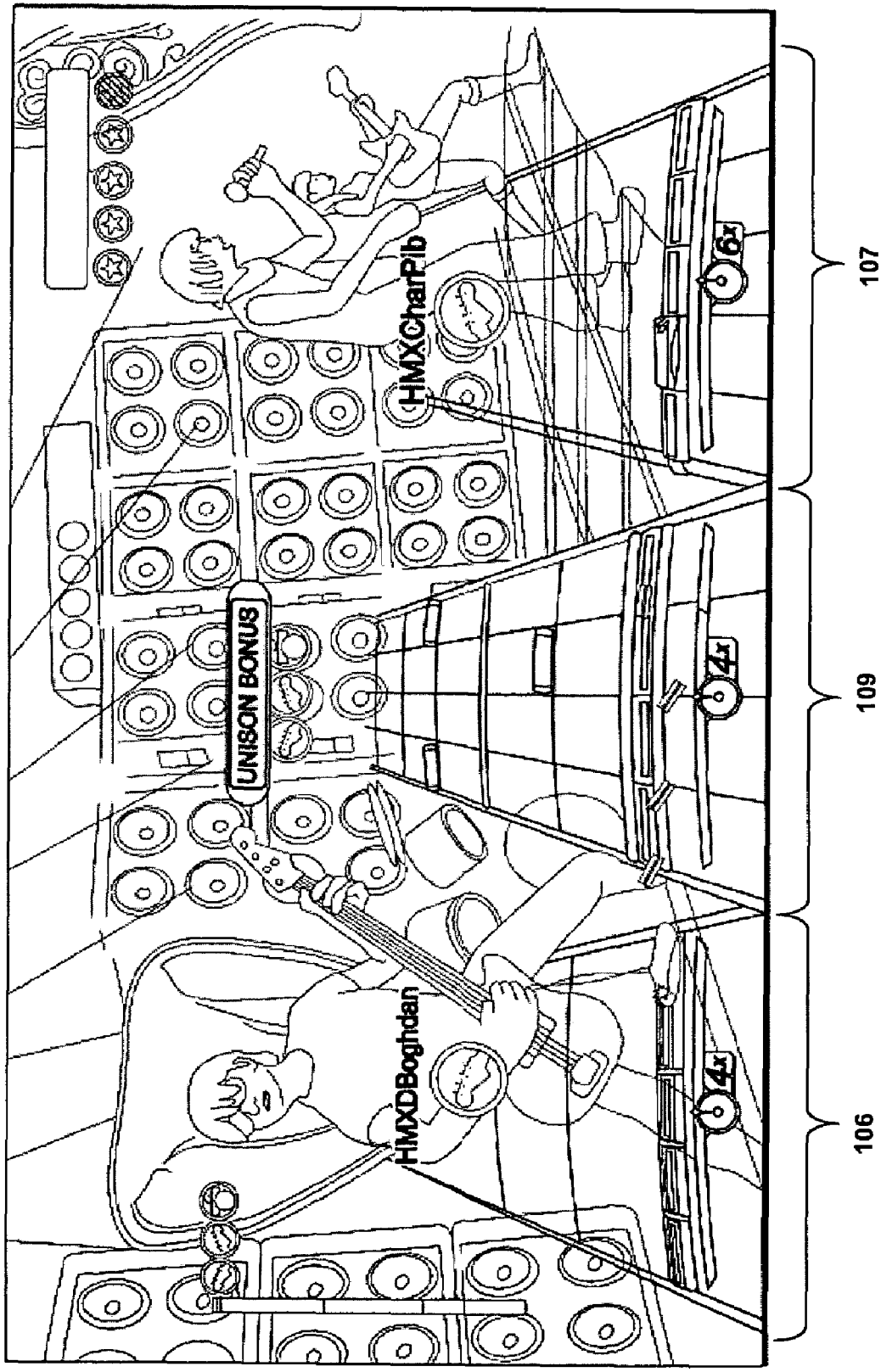
FIG. 1D is an example screenshot of one embodiment of network play of a rhythm action game.

Referring now to FIG. 1D, one embodiment of a screen display for remote multiplayer play is shown. The embodiment of the screen display shown in FIG. 1D may be used for head-to-head play, for simultaneous competition, and for cooperative play. As shown in FIG. 1D, a local player's lane 105 is shown larger than the lanes 106 107 of two remote players. The avatars for remote players may appear normally on stage in a similar manner as if the avatars represented local players. In other embodiments, the lanes may be displayed in a similar manner for both local multiplayer and remote multiplayer. In still other embodiments, in remote multiplayer, only the local player or player's avatars may be shown.

As shown in FIG. 1D, the lanes 106, 107 associated with the remote players are shown smaller than the local player's lane. In other embodiments, the lanes of one or more remote players may be graphically distinguished in any other way. For example, the remote players' lanes may be shown translucently. Or for example, the remote players' lanes may have a higher transparency than local player's lanes. Or the remote players' lanes may be shown in grayscale, or in a different screen location than local players' lanes. In some embodiments, a remote vocalist's lane may not be shown at all, and instead only the lyrics of the song may be displayed.

In some embodiments, multiple players participate in an online face-off between two bands. A "band" is two or more players that play in a cooperative mode. In some embodiments, the two bands need to have the same types of instruments at the same difficulty level selection, i.e., a guitarist playing on "hard" and a bassist playing on "medium" playing against a guitarist playing on "hard" and a bassist playing on "medium." In other embodiments, the two bands still need to have the same types of instruments but the difficulty selections can be different: Players participating at a lower difficulty level simply have fewer gems to contribute to the overall score. The song to be played may be selected after the teams have been paired up. Alternatively, a band may publish a challenge to play a particular song and a team may accept the challenge.

For example, a local group of players may formed a band and give their band a name ("The Freqs."). Each of the four players in the "The Freqs" is local to one another. They may then competing against a team of players located remotely, who have formed a band called "The Champs." In some cases "The Champs" may each be local to one another. In other cases, members of "The Champs" my be remote to each other. Each player in "The Freqs" and "the Champs" may see a display similar to FIG. 1A or FIG. 1B. However, in some embodiments, an additional score meter may be displayed showing the score of the other band. In other embodiments any other measure and indication of performance of a band may be given. For example, in some embodiments, meters may be displayed for each band indicating relative performance, crowd engagement, percentage of notes hit, or any other metric. In some embodiments, a four-in-one meter 180 as depicted in FIG. 1A may be displayed for each band. In some embodiments, avatars from both bands may be depicted on the stage.

In some embodiments, the bands "trade" alternating portions of the musical composition to perform; that is, the performance of the song alternates between bands. In these embodiments, musical performance output from "The Champs" is reproduced locally at the gaming platform used by "The Freqs" when "The Champs" are performing. Similarly, the musical performance of "The Freqs" is reproduced remotely (using the emulation parameter technique described above) at the gaming platform of "The Champs" when "The Freqs" are performing. In other embodiments, the bands play simultaneously. In these embodiments, the displayed score may be the only feedback that "The Freqs" are provided regarding how well "The Champs" are performing.

In some particular embodiments, members of cooperating bands may be local to one another or remote from one another. Similarly, members of competing bands may be local to one another or remote from one another. In one example, each player is remote from every other player.

In some embodiments, players may form persistent bands. In these embodiments, those bands may only compete when at least a majority of the band in available online. In some of the embodiments, if a member of a persistent band in not online and the other band members want to compete, a gaming platform may substitute for the missing band member. Alternatively, a player unaffiliated with the band may substitute for the missing band member. In still other embodiments, a stream of emulation parameters stored during a previous performance by the missing band member may be substituted for the player. In other embodiments, an online venue may be provided allowing players to form impromptu bands. Impromptu bands may dissolve quickly or they may become persistent bands.

Although FIGS. 1A, 1B and 1D show a band comprising one or more guitars, a drummer, and a vocalist, a band may comprise any number of people playing any musical instruments. Instruments that may be simulated and played in the context of a game may include, without limitation, any percussion instruments (including cymbals, bell lyre, celeste, chimes, crotales, glockenspiel, marimba, orchestra bells, steel drums, timpani, vibraphone, xylophone, bass drum, crash cymbal, gong, suspended cymbal, tam-tam, tenor drum, tom-tom, acme siren, bird whistle, boat whistle, finger cymbals, flex-a-tone, mouth organ, marching machine, police whistle, ratchet, rattle, sandpaper blocks, slapstick, sleigh bells, tambourine, temple blocks, thunder machine, train whistle, triangle, vibra-slap, wind machine, wood block, agogo bells, bongo drum, cabaca, castanets, claves, conga, cowbell, maracas, scraper, timbales, kick drum, hi-hat, ride cymbal, sizzle cymbal, snare drum, and splash cymbal), wind instruments (including piccolo, alto flute, bass flute, contra-alto flute, contrabass flute, subcontrabass flute, double contrabass flute, piccolo clarinet, sopranino clarinet, soprano clarinet, basset horn, alto clarinet, bass clarinet, contra-alto clarinet, contrabass clarinet, octocontra-alto clarinet, octocontrabass clarinet, saxonette, soprillo, sopranino saxophone, soprano saxophone, conn-o-sax, clar-o-sax, saxie, mezzo-soprano saxophone, alto saxophone, tenor saxophone, baritone saxophone, bass saxophone, contrabass saxophone, subcontrabass saxophone, tubax, aulochrome, tarogato, folgerphone, contrabassoon, tenoroon, piccolo oboe, oboe d'amore, English horn, French horn, oboe de caccia, bass oboe, baritone oboe, contrabass oboe, bagpipes, bugle, cornet, didgeridoo, euphonium, flugelhorn, shofar, sousaphone trombone, trumpet, tuba, accordion, concertina, harmonica, harmonium, pipe organ, voice, bullroarer, lasso d'amore, whip and siren), other stringed instruments (including harps, dulcimer, archlute, arpeggione, banjo, cello, Chapman stick, cittern, clavichord, double bass, fiddle, slide guitar, steel guitar, harpsichord hurdy gurdy, kora, koto, lute, lyre, mandola, mandolin, sitar, ukulele, viola, violin, and zither) and keyboard instruments (including accordion, bandoneon, calliope, carillon, celesta, clavichord, glasschord, harpsichord, electronic organ, Hammond organ, pipe organ, MIDI keyboard, baby grand piano, electric piano, grand piano, janko piano, toy piano, upright piano, viola organista, and spinets).

Figure 2:
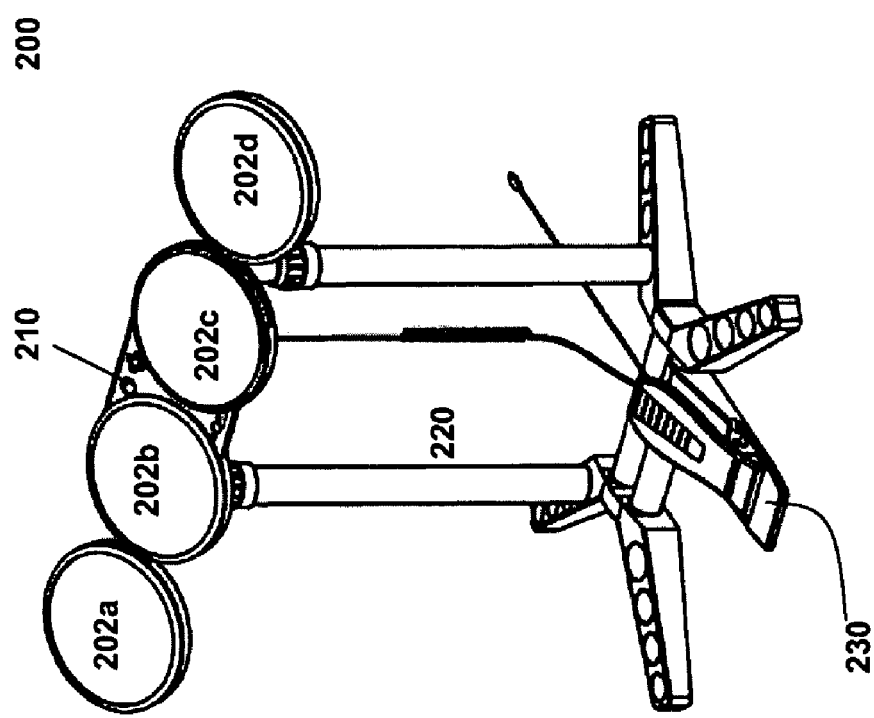
FIG. 2 is an illustration of one embodiment of simulated drum set for use with a video game.

Referring now to FIG. 2, an embodiment of a simulated drum set for use with a video game is shown. In brief overview, a simulated drum set 200 comprises a number of drum pads 202a, 202b, 202c, 202d (generally 202). The simulated drum set 200 may also comprise a controller 210 with various buttons, switches, and/or joysticks. The simulated drum set may also comprise a foot pedal 230 to simulate a foot-activated percussion instrument, such as a bass drum or hi-hat. The simulated drum set 200 may be mounted on a stand 220 to elevate the drum pads 202 and secure the foot pedal 230.

Still referring to FIG. 2, now in greater detail, a simulated drum set may comprise any number of drum pads 202, including without limitation zero, one, two, three, four, five, six, seven, eight, nine, or ten. Upon a user striking a drum pad 202, the drum set 200 may transmit a signal to a game system that the pad was struck. This signal may be transmitted via any means, including cables and wireless signals. The signal may comprise any information about a strike including without limitation the time, force, duration, location on the pad, size of the object striking the pad, and texture of the object striking the pad. For example, the drum set may transmit a signal indicating that pad 202b was struck with a force above a given threshold. Or, for example, the drum set may transmit a signal indicating that pad 202c was struck very near the rim of the pad.

In some embodiments, the drum pads 202 may be struck with drum sticks used with ordinary drums. In other embodiments, the drum pads 202 may be struck with customized drum sticks designed specially to work with the set 200.

During a game session, each drum pad may be configured to simulate an individual percussion instrument. For example, a user striking a drum pad 202a may cause a snare drum sound to be played, while the user striking drum pad 202b may cause a tom-tom sound to be player, while the user striking drum pad 202d may cause a crash cymbal sound to be played. In some embodiments, the played sound may reflect any of the properties of the user's strike of the drum pad. For example, a game may play a louder snare drum sound in response to a user hitting a drum pad harder. Or for example, a game may alter the sound of a ride cymbal played depending on how close to the center or the rim of the drum pad the user strikes. In some embodiments, the sound played in response to a drum pad strike may be chosen from a prerecorded library of percussion sounds. In other embodiments, in response to a user successfully striking a pad 202 corresponding to an on screen gem, a portion of a pre-recorded drum track corresponding to the current song may be played.

The drum set 200 may also comprise a number of foot pedals 230. In some embodiments, a single foot pedal may be provided. In other embodiments, any number of foot pedals may be provided, including two (such as one to simulate a bass drum and one to simulate a hi-hat), three or four. During a game, the foot pedal may be used to create any percussion sound.

In some embodiments, a drum set 200 may comprise a stand 220 which allows a user to sit or stand while playing the drum pads, and still have access to the foot pedal 230. In one embodiment, the stand may allow a user to adjust the height of the drum pads as a whole. In another embodiment, the stand 220 may allow a user to adjust the height of the drum pads individually. In still another embodiment, the stand 220 may allow a user to adjust the position of one or more pads, such as by swiveling one or more pads closer to the player. In some embodiments, the stand 220 may allow a user to adjust the placement of the foot pedal, including moving the foot pedal forwards, backwards, and side-to-side. In one embodiment, the foot pedal and/or drum pads 202 may be detachable from the stand. In this embodiment, the drum pads 202 may be placed on a table top or held on a player's lap.

In some embodiments, a simulated drum set 200 may include a controller 210. The controller may comprise inputs for configuring the simulated drum set, including, for example, sensitivity, left/right handed switching, and turning the drum set on and off. The controller 210 may also comprise any other game inputs. In some embodiments, the controller 210 may comprise some or all of the functionality of a standard game controller for any of the game systems described herein. In some embodiments, the controller may be used for navigating menus, or inputting configuration or other game data.

A simulated drum set 200 may also comprise any other elements incorporated in game controllers. In some embodiments, a drum set 200 may comprise a speaker which may provide individual feedback to the player about the player's performance. In large multiplayer games, this individual speaker may assist a player in assessing their performance and hearing whether or not they missed a note. In other embodiments, a drum set 200 may comprise a microphone which may be used to chat with other players, provide vocal input, or provide hand claps, microphone taps, or other aural input. In other embodiments, such an individual speaker may be included in any other simulated instrument, including a guitar and/or microphone.

In some embodiments, the drum pads 202 and/or foot pedal 230 may be color coded. For example, drum pad 202a may be green, pad 202b may be red, pad 202c may be yellow, pad 202d may be blue, and the foot pedal 230 may be orange. Color coding may be indicated in any manner, including the color of the pads 202, the color of the rims surrounding the pads 202, the color of an icon or design on the pads 202 or rims, or one or more labels on the pads, rims, and/or stand. The color code of the foot pedal may also be indicated in any manner, including the color of the foot pedal, the color of a design or icon on the foot pedal, or one or more labels on the foot pedal or stand.

In addition to being used during gameplay, in some embodiments the simulated drum set may be used to navigate one or more menus or produce other game input. For example, a game may display a menu to users in which different menu options are color coded. A user may then strike the drum pad or stomp the foot pedal corresponding to the color of a menu option to activate that menu option. Or for example, a series of menus may be provided in which a user may use two drums 202b 202c to cycle up and down among choices within a menu, and use two drums 202a, 202d to move forward and backward between different menus. In some embodiments, one or more drums may be assigned a designated function throughout a game interface. For example, during the course of navigating a series of menus, startup, and/or configuration screens, a player may always be able to use the foot pedal to return to a main screen. Or for example, the player may always be able to use the leftmost drum 202d to alter a currently selected option. In some embodiments, navigating menus and configuration screens may be done via a combination of the drum pads, foot pedal, and controller.

Figure 3A:
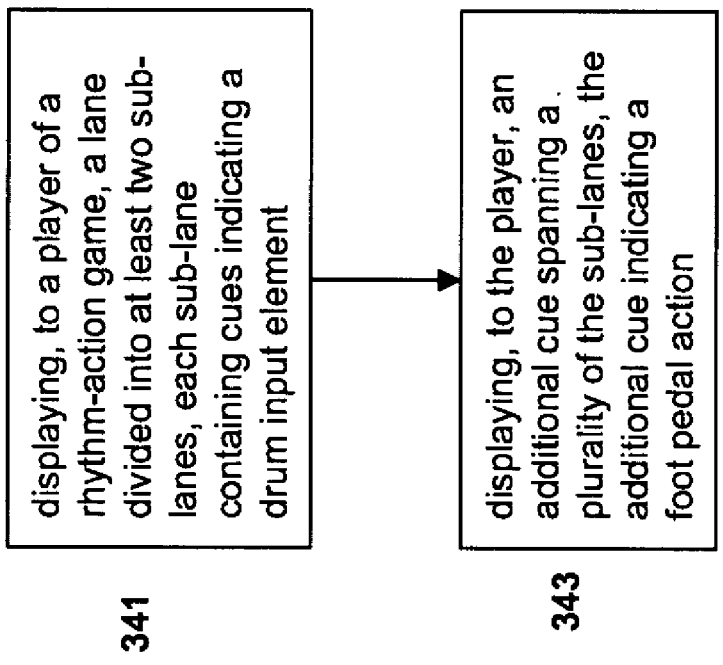
FIG. 3A is a flow diagram of a method for displaying a foot-pedal cue in a rhythm-action game.

Referring now to FIG. 3A, a flow diagram of one embodiment of a method for displaying a foot-pedal cue in a rhythm-action game is shown. In brief overview, the method includes: displaying, to a player of a rhythm-action game, a lane divided into at least two sub-lanes, each sub-lane containing cues indicating a drum input element (step 341); and displaying, to the player, an additional cue spanning a plurality of the sub-lanes, the additional cue indicating a foot pedal action (step 343). In some embodiments, the additional cue may span all the sub-lanes. In some embodiments, the additional cue may be a different color than other cues.

Still referring to FIG. 3A, a lane divided into at least two sub-lanes, each sub-lane containing cues indicating a drum input element, may be displayed to a player in any manner (step 341). In some embodiments, a lane may be divided into two sub-lanes. In other embodiments, a lane may be divided into any number of sub-lanes including without limitation, two, three, four, five, six, seven, eight, nine, or ten sub-lanes. A sub-lane may comprise any division of a lane containing cues corresponding to a single input element, and may comprise any shape or orientation.

In some embodiments, lines or other demarcations may be displayed in between sub-lanes. For example, referring back to FIG. 1A, a line is used to indicate a separation between sub-lane 171 and sub-lane 172. In other embodiments, no such line or demarcation may be displayed. For example, referring ahead to FIG. 3B, the lane shown is divided into four sub-lanes, 351, 352, 353, 354 which are not separated by lines or other indicators.

Figure 3B:
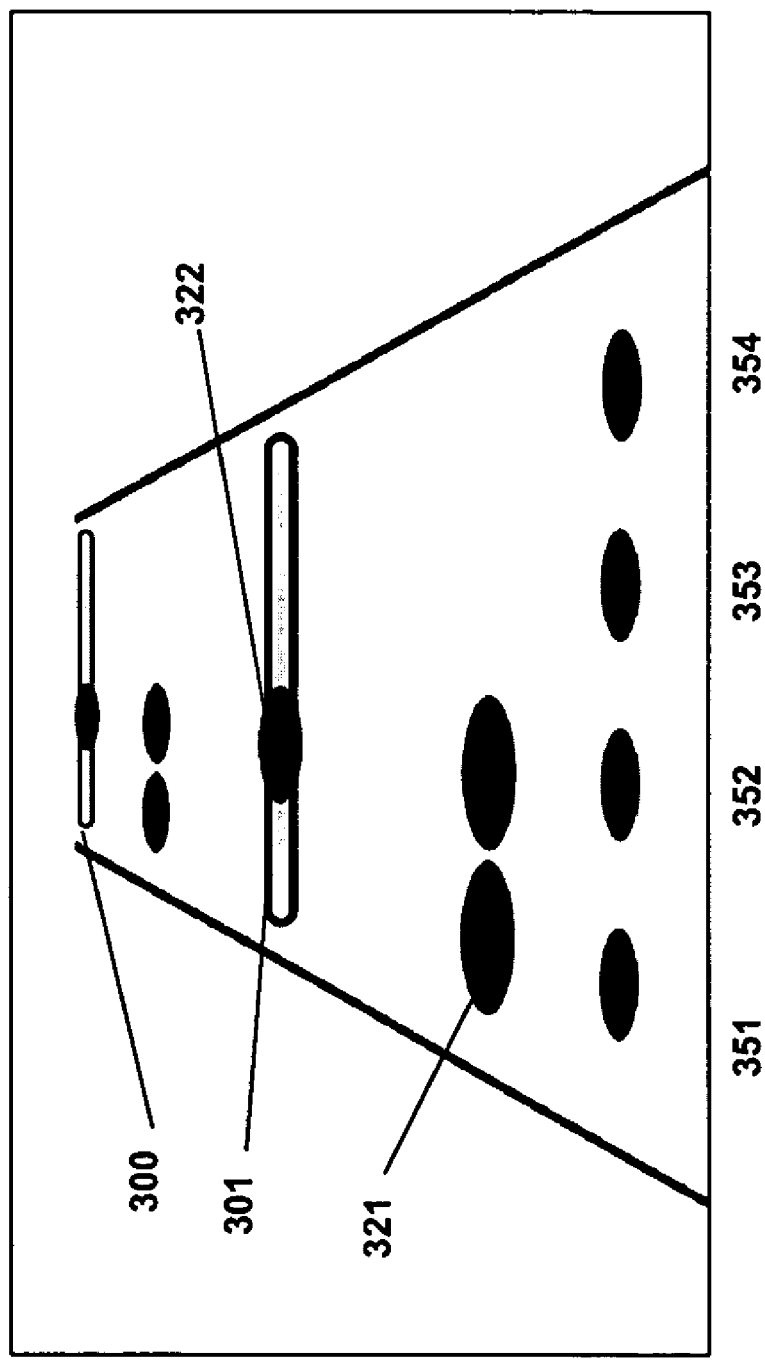
FIG. 3B is an example illustration of one embodiment of displaying cues spanning a plurality of sub-lanes.

In some embodiments, each sub-lane may contain cues corresponding to a different drum pad. For example, a lane may be divided into four sub-lanes, each sub-lane corresponding to one of four drum pads. Referring ahead to FIG. 3B, an example diagram of such a lane is shown. The lane is divided into four sub-lanes, 351, 352, 353, 354. Each lane may correspond to a drum pad in a linear arrangement. For example, using the drum set 200 from FIG. 2, sub-lane 351 may correspond to drum pad 202a, sub-lane 352 may correspond to drum pad 202b, sub-lane 353 may correspond to drum pad 202c, and sub-lane 354 may correspond to drum pad 202d. As used herein a "linear" arrangement of drum pads or other input elements does not necessarily indicate input elements arranged in a straight line, but rather any arrangement of input elements which have a clear left-to-right sequence or top-to-bottom sequence. For example, the drum set 200 may be configured such that the pads 202a, 202b, 202c, 202d are arranged in a curve where pads 202a and 202d are moved closer to the player. In this case the pads still comprise a linear arrangement for purposes of this description, as they still have a clear left-to-right sequence.

In some embodiments, cues in each sub-lane may always correspond to a given percussion sound during a song. For example, cues in sub-lane 350a may correspond to a snare drum, while cues in sub-lane 350*b*, 350*c* may correspond to tom-tom sounds while cues in sub-lane 350*d* may correspond to crash cymbal sounds. In other embodiments, cues in a single sub-lane 550 may correspond to different percussion sounds over the course of a song. For example, during the course of a song, gems in sub-lane 350*d* may first correspond to cowbell sounds, and then correspond to a crash cymbal sound. In some embodiments, the display of cues within a sub-lane may be changed to indicate to a user that the cues represent a different percussion sound.

Figure 3C:
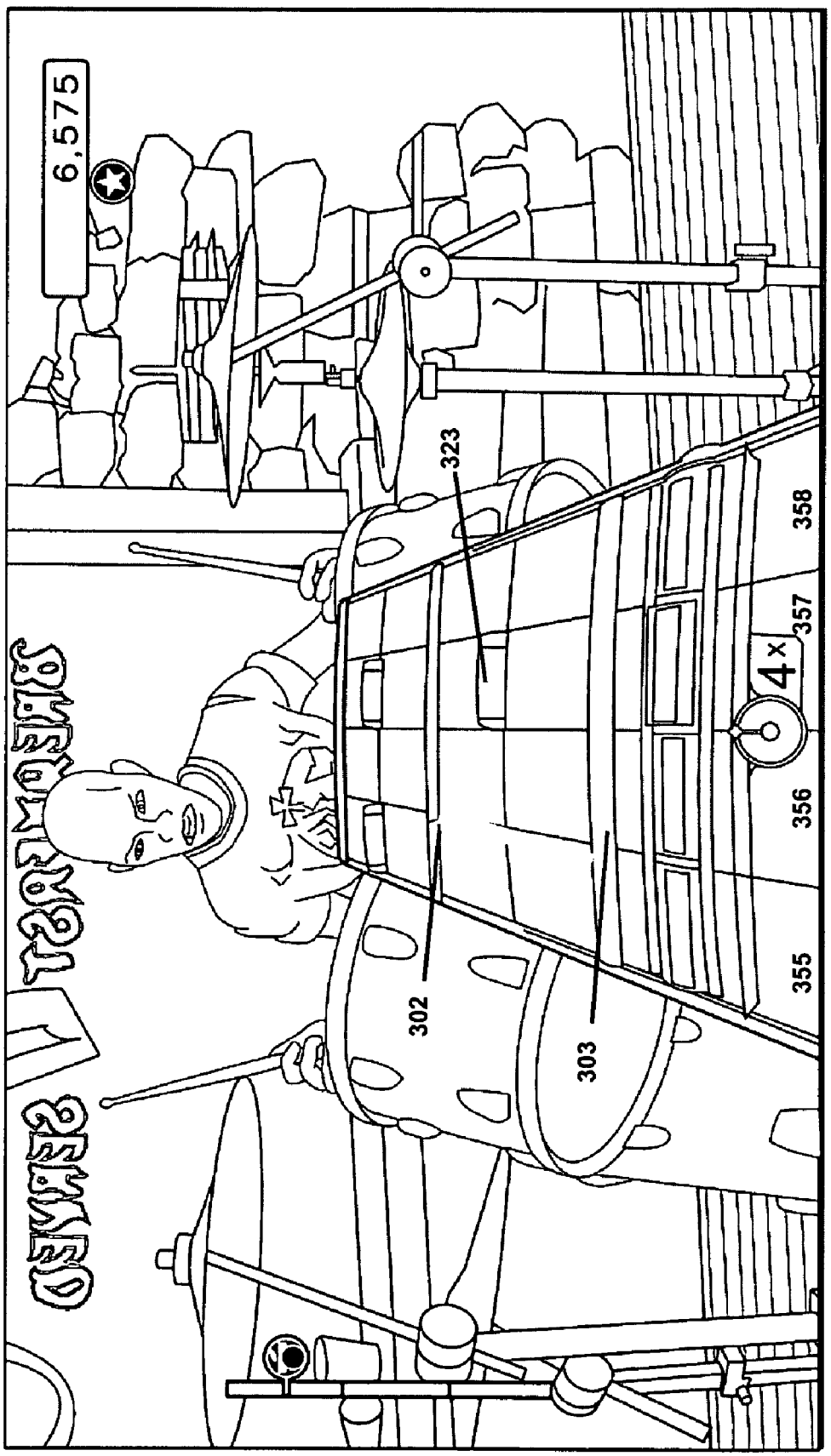
FIGS. 3C and 3D are example screenshots of embodiments of displaying cues spanning a plurality of sub-lanes.

Referring back to FIG. 3A, a cue spanning a plurality of the sub-lanes may be displayed in any manner (step 343). In some embodiments, the cue may indicate a foot-pedal action. In some embodiments, the cue may span all the sub lanes, such as the cues 300 and 301 in FIG. 3B, the cues 302, 303 in FIG. 3C, or the cue 304 in FIG. 3D. The cue spanning a plurality of the sub-lanes may be displayed in any shape, size or color.

A cue may span a plurality of sub-lanes by occupying a portion of visual space corresponding to each of the plurality of sub-lanes. In some embodiments, a cue may span a plurality of sub-lanes by being displayed as covering some or all of each of the plurality of sub-lanes. For example, the cue 303 in FIG. 3C covers a portion of each of the sub lanes 355, 356, 357, and 358. Or for example, the cue in 300 in FIG. 3B covers a portion of each of the sub lanes 351, 352, 353, and 354. This is true even though a portion of the cue 301 in sub-lane 352 is in turn overlaid by a cue 322 which corresponds to sub-lane 352. In other embodiments, a cue may span a plurality of sub-lanes by being displayed in space above or below each of the plurality of sub-lanes. For example, a cue may be displayed that appears to "hover" over the plurality of sub-lanes. Or for example, a cue may be displayed that appears to be attached to the bottom or hovering beneath each of the plurality of the plurality of sub-lanes.

Figure 3D:
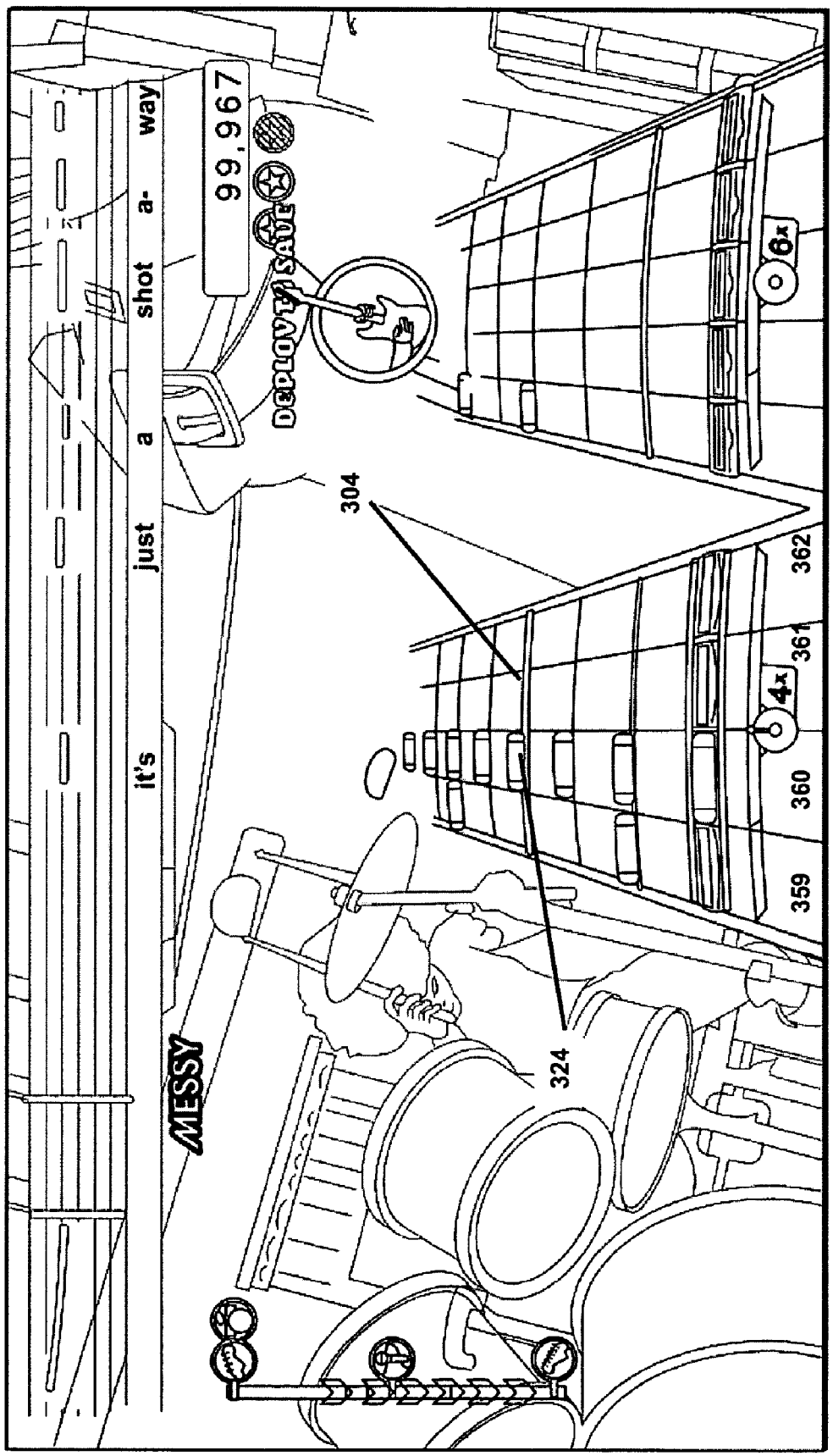

In some embodiments, a cue spanning a plurality of sub-lanes may have one or more cues corresponding to an individual sub-lane overlaid on the cue. For example, the cue 300 in FIG. 3B is displayed such that it appears to be "under" the cue 322. Likewise, the cue 324 in FIG. 3D is overlaid over the cue 304. This may be done to indicate a foot-pedal action simultaneous with one or more drum pad strikes or other actions. In other embodiments, a cue spanning a plurality of sub-lanes may be displayed such that it appears "over" any cues corresponding to the individual sub-lanes.

In some embodiments, a cue spanning a plurality of sub-lanes may comprise a different color than any of the cues corresponding to individual sub-lanes.

Figure 4B:
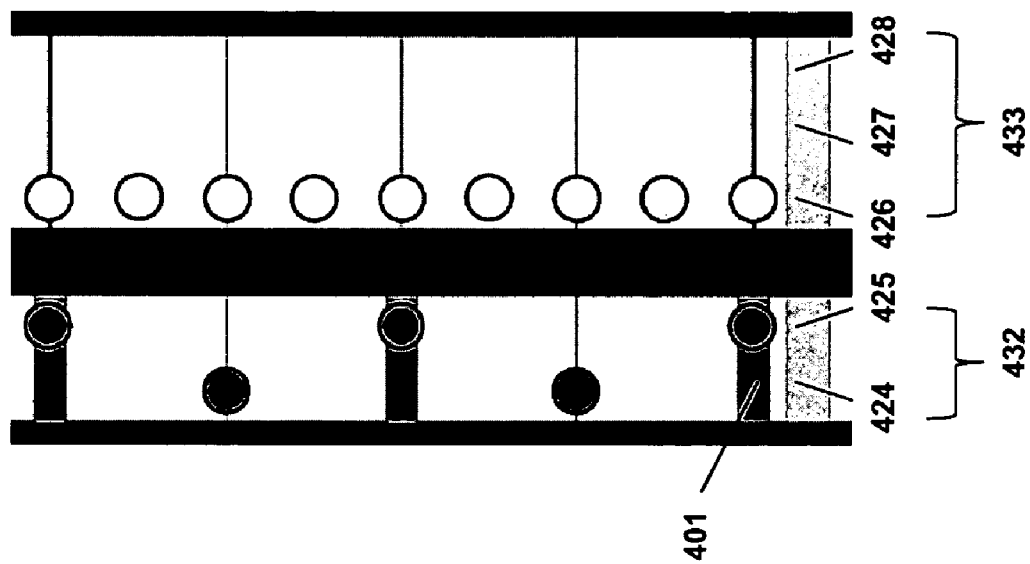
FIGS. 4A and 4B are example diagrams of alternative embodiments of displaying cues spanning a plurality of sub-lanes.
Figure 4A:
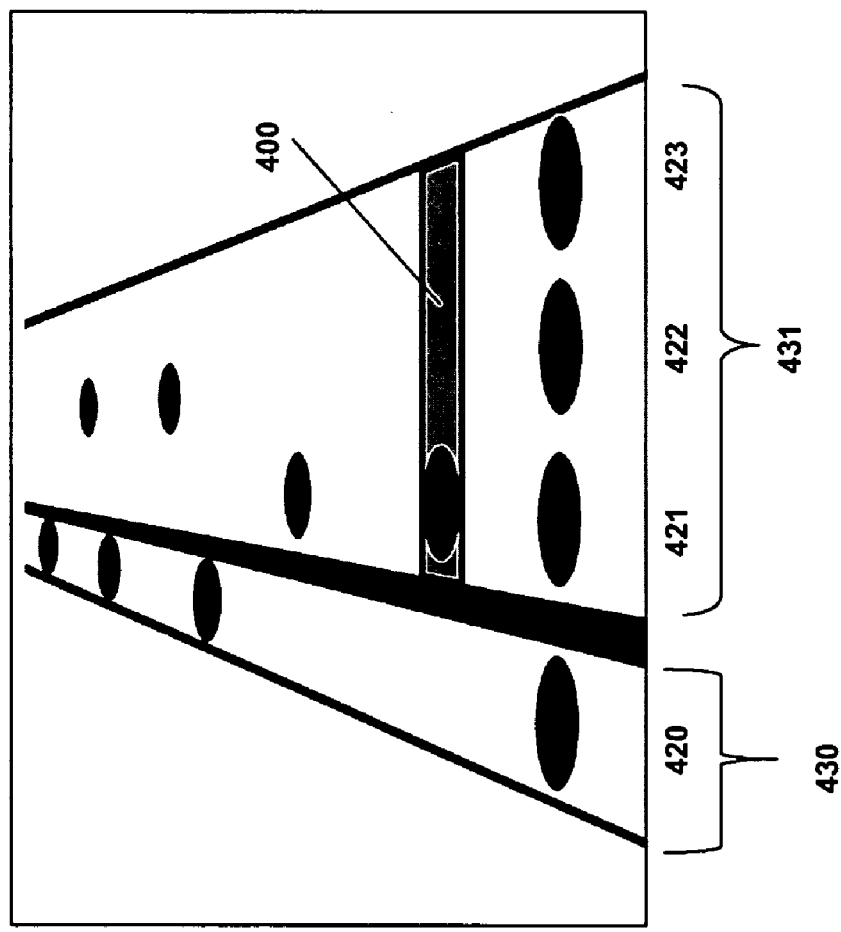

Referring now to FIGS. 4A and 4B, additional examples of a display of a cue spanning multiple sub-lanes are shown. In FIG. 4A, a lane is divided into four sub-lanes 420, 421, 422, 423. A cue 400 spans the three sub lanes 421, 422, and 423. In the illustration shown, the sub-lanes 421 and 420 are separated by a larger divider than the other sub-lanes, forming two divisions 430, 431. This may be done to indicate that the sub-lanes on one side of the divider correspond to a certain set of drum pads, while the sub-lanes on the other side of the divider correspond to a different set of drum pads. In FIG. 4B, a lane is divided into five sub-lanes 424, 425, 426, 427, 428. the lane is also divided into two divisions 432, 433. The cue 401 spans both sub-lanes 424 and 425 and may be used to indicate a foot pedal action.

In some embodiments, multiple foot pedals may be used, and different types of cues spanning multiple sub-lanes may be used to indicate which pedal a user should strike. For example, a drum set may comprise an orange color-coded pedal and a purple color-coded pedal. An orange cue spanning all the sub-lanes may be used to indicate the user should step on the orange pedal, and a purple cue spanning all the sub lanes may be used to indicate the user should step on the purple pedal. Or, for example, a drum set may comprise a left foot-pedal and a right foot-pedal. A cue spanning a plurality of sub-lanes on the right side of a lane may indicate the right foot pedal, while a cue spanning a plurality of sub-lanes on the left side of a lane may indicate the left foot pedal. In this case, a display similar to FIG. 4B might be used, where a cue 401 spanning the entire division 432 would indicate a left foot pedal action, and a cue spanning the entire division 433 would indicate a right foot pedal action.

Although cues spanning multiple sub-lanes have been described above in the context of indicating foot-pedal actions, they may be useful in for indicating any other type of input event. In some embodiments, cues spanning multiple sub-lanes may be used in any case where a series of X input elements corresponds to a series of X sub-lanes, and there is a need to indicate an additional input action not in the series. The use of a cue spanning multiple lanes can serve as a clear indication to the player that the additional input action is different in character and/or location than the input elements in the series.

Figure 5:
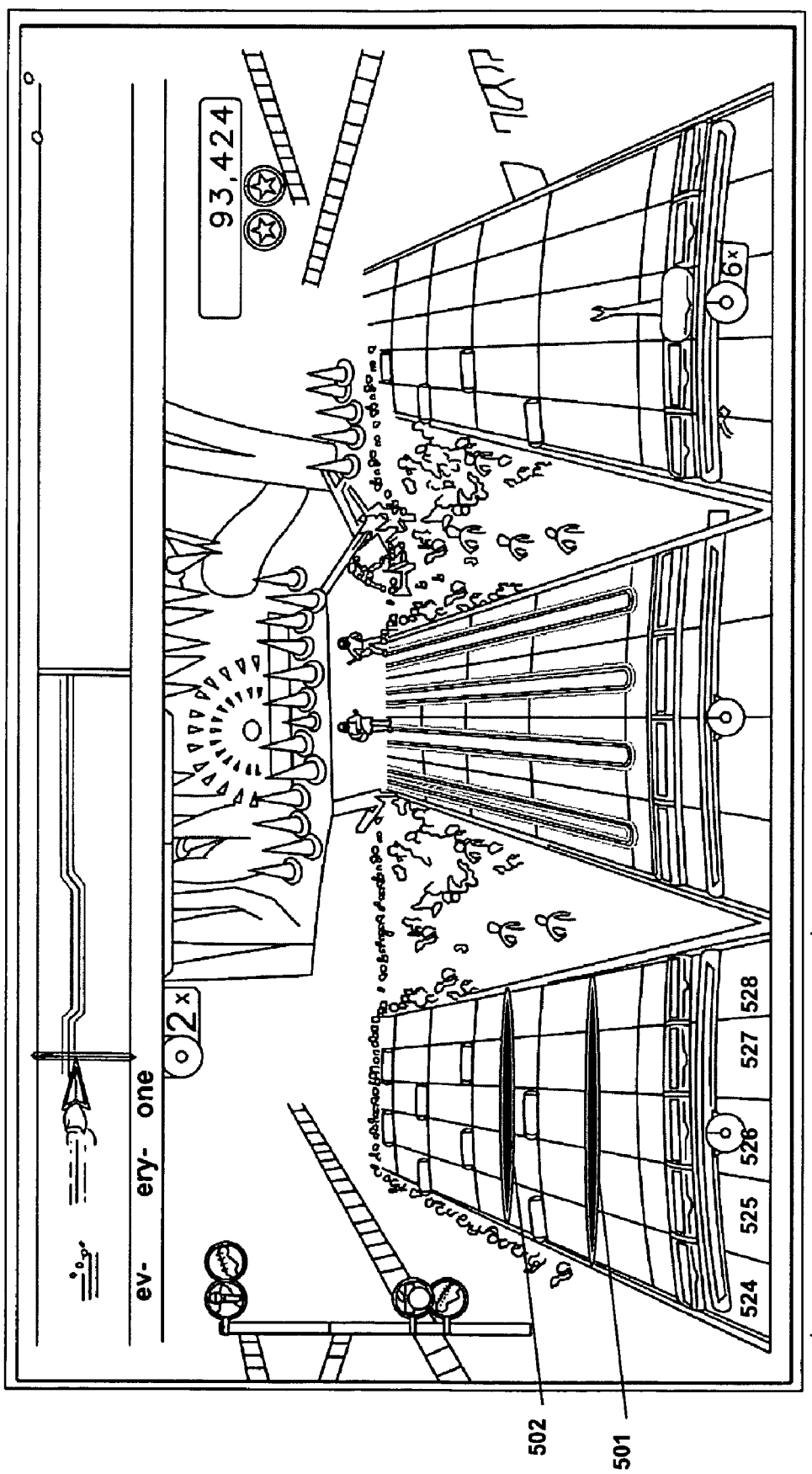
FIG. 5 depicts an embodiment where a lane is divided into five sub-lanes, each corresponding to a fret button on a simulated guitar, and a cue spanning all the sub-lanes indicates an area where the player strums a guitar without depressing any fret buttons.

Referring now to FIG. 5, a lane 512 is divided into 5 sub-lanes 524, 525, 526, 527, 528, each corresponding to a fret button on a simulated guitar. Each sub-lane thus may contain cues that, when they reach the target marker, indicate the user should depress the corresponding fret button and strum the simulated guitar. A cue 501, 502 spanning all the sub-lanes 524, 525, 526, 527, 528 may indicate an "open strum," that is, where the player strums a guitar without depressing any fret buttons.

Other examples of input actions that may be indicated by a cue spanning multiple sub-lanes include, without limitation, a foot-pedal-action on a simulated keyboard, a striking of a microphone, and a tilting of a guitar.

Aspects of the present invention may be provided as one or more computer-readable programs embodied on or in one or more articles of manufacture comprising computer readable media. The article of manufacture may be a floppy disk, a hard disk, a CD-ROM, DVD, other optical disk, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as executable instructions. In some embodiments, portions of the software programs may be stored on or in one or more articles of manufacture, and other portions may be made available for download to a hard drive or other media connected to a game platform. For example, a game may be sold on an optical disk, but patches and/or downloadable content may be made available online containing additional features or functionality.

Having described certain embodiments of the invention, it will now become apparent to one of skill in the art that other embodiments incorporating the concepts of the invention may be used.

We claim:

1. A method executed by a game platform for rendering, on a screen display, a foot-pedal cue in a rhythm-action video game, the method comprising:
   a. displaying via the screen display, to a player of the rhythm-action video game, a lane divided into at least two sub-lanes, each sub-lane containing cues indicating a drum input element;
   b. displaying via the screen display, to the player, an additional cue spanning a plurality of the sub-lanes and not confined to a distinct sub-lane, the additional cue indicating a foot pedal action; and c. displaying via the screen display, to the player, a cue contained within a sub-lane and overlaid over the additional cue spanning a plurality of the sub-lanes.

2. The method of claim 1, wherein the additional cue spans all of the at least two sub-lanes.

3. The method of claim 1, wherein each sub-lane contains cues indicating a drum input element of a set of linearly arranged drum input elements.

4. The method of claim 1, wherein each sub-lane contains cues indicating a drum pad of a set of linearly arranged drum pads.

5. The method of claim 1, wherein the at least two sub-lanes contain cues of a set of colors, and the additional cue is a color not in the set of colors.

6. The method of claim 1, wherein the cue contained within a sub-lane and overlaid over the additional cue spanning a plurality of the sub-lanes indicates a simultaneous drum pad strike and foot pedal action.

7. A computer program product, tangibly embodied in a computer-readable medium, for rendering, on a screen display, a foot-pedal cue in a rhythm-action video game, the computer program product including executable instructions operable to cause a game platform to:

render on the screen display, to a player of the rhythm-action video game, a lane divided into at least two sub-lanes, each sub-lane containing cues indicating a drum input element;

render on the screen display, an additional cue spanning a plurality of the sub-lanes and not confined to a distinct sub-lane, the additional cue indicating a foot pedal action; and render on the screen display a cue contained within a sub-lane and overlaid over the additional cue spanning a plurality of the sub-lanes.

8. The computer program product of claim 7, wherein the additional cue spans all of the at least two sub-lanes.

9. The computer program product of claim 7, wherein each sub-lane contains cues indicating a drum input element of a set of linearly arranged drum input elements.

10. The computer program product of claim 7, wherein each sub-lane contains cues indicating a drum pad of a set of linearly arranged drum pads.

11. The computer program product of claim 7, wherein the at least two sub-lanes contain cues of a set of colors, and the additional cue is a color not in the set of colors.

12. The computer program product of claim 7, wherein the cue contained within a sub-lane and overlaid over the additional cue spanning a plurality of the sub-lanes indicates a simultaneous drum pad strike and foot pedal action.

13. A method executed by a game platform for rendering, on a screen display, cues in a rhythm-action video game to indicate a specific input element, the method comprising:

a. displaying, via the screen display, to a player of the rhythm-action video game, a lane divided into X sub-lanes, each sub-lane containing cues indicating a unique one of a set of X input actions; and b. displaying, via the screen display, to the player, an additional cue spanning a plurality of the sub-lanes and not confined to a distinct sub-lane, the additional cue indicating a first input action not in the set of X input actions;

c. displaying via the screen display, to the player, a cue contained within one of the X sub-lane and overlaid over the additional cue spanning a plurality of the sub-lanes.

14. The method of claim 13, wherein each of the set of X input actions corresponds to an input element in a linear arrangement, and the first input action corresponds to an input element not in the linear arrangement.

15. The method of claim 14, wherein the additional cue spans all of the X sub-lanes.

16. The method of claim 13, wherein each of the set of X input actions identifies a fret button to be depressed in combination with a strum, and the first input action corresponds to an open strum.

17. The method of claim 16, wherein the additional cue spans all of the X sub-lanes.

18. A system comprising:

a display device; and a game platform comprising a processor, the processor configured to:

display, via the display device, a lane divided into at least two sub-lanes, each sub-lane containing cues indicating a drum input element;

display, via the display device, an additional cue spanning a plurality of the sub-lanes and not confined to a distinct sub-lane, the additional cue indicating a foot pedal action; and display, via the display device, a cue contained within a sub-lane and overlaid over the additional cue spanning a plurality of the sub-lanes.

19. The game platform system of claim 18, wherein the additional cue spans all of the at least two sub-lanes.

20. The game platform system of claim 18, wherein each sub-lane contains cues indicating a drum input element of a set of linearly arranged drum input elements.

21. The game platform system of claim 18, wherein each sub-lane contains cues indicating a drum pad of a set of linearly arranged drum pads.

22. The game platform system of claim 18, wherein the at least two sub-lanes contain cues of a set of colors, and the additional cue is a color not in the set of colors.

23. The game platform system of claim 18, wherein the cue contained within a sub-lane and overlaid over the additional cue spanning a plurality of the sub-lanes indicates a simultaneous drum pad strike and foot pedal action.

* * * * *

UNITED STATES PATENT AND TRADEMARK OFFICE
CERTIFICATE OF CORRECTION

PATENT NO. : 7,625,284 B2
APPLICATION NO. : 12/139880
DATED : December 1, 2009
INVENTOR(S) : Kay et al.

Page 1 of 1

It is certified that error appears in the above-identified patent and that said Letters Patent is hereby corrected as shown below:

Column 22, line 18, cancel the text beginning with "16. The method of claim 13" and ending "open strum." in column 22, line 21.

Column 22, line 22, cancel the text beginning with "17. The method of claim 16" and ending "X sub-lanes." in column 22, line 23.

Signed and Sealed this

Thirtieth Day of March, 2010

David J. Kappos
*Director of the United States Patent and Trademark Office*